United States Patent [19]

Pomernacki

[11] 4,252,023
[45] Feb. 24, 1981

[54] VIBRATION TESTING SYSTEM FOR GEAR SETS

[75] Inventor: Henry Pomernacki, Northbrook, Ill.
[73] Assignee: Illinois Tool Works Inc., Chicago, Ill.
[21] Appl. No.: 100,619
[22] Filed: Nov. 27, 1979
[51] Int. Cl.³ .............................................. G01M 13/02
[52] U.S. Cl. .......................................... 73/593; 73/162
[58] Field of Search ................... 73/593, 162; 33/179.5

[56] References Cited

U.S. PATENT DOCUMENTS

| | | | |
|---|---|---|---|
| 2,965,971 | 12/1960 | Pomernacki | 73/593 X |
| 3,842,663 | 10/1974 | Harting et al. | 73/593 |

FOREIGN PATENT DOCUMENTS

689877  6/1964  Canada ...................................... 73/162

*Primary Examiner*—James J. Gill
*Attorney, Agent, or Firm*—Thomas W. Buckman; Glenn Bowen

[57] ABSTRACT

A pair of gears, which form a gear set, are tested by mounting the gears on parallel axis spindles which are located at a fixed center distance. One of the parallel axis spindles is contained in a spindle housing that is rigidly mounted to a massive base. The other gear of the set is contained in a spindle housing which is supported on top of a pair of parallel leaf springs that are connected to the base. The spindle in the spindle housing that is rigidly mounted on the base carries a pulley at its end that is remote from the gear set which is coupled through a drive belt and a second pulley to a drive motor. The spindle in the resiliently mounted spindle housing on the leaf springs is coupled to an eddy current brake at its end which is remote from the gear set. An accelerometer, which is coupled to a conventional electronic output indicator, is mounted on the resiliently mounted spindle to provide indications of the vibrations caused by the gear sets. The gears of the gear set are driven by the drive motor so that their tooth-to-tooth frequency is approximately the same as the resonant frequency of the resiliently mounted spindle housing. The construction of the testing system in the described manner substantially improves the signal-to-noise ratio of the output signal that is obtained from the accelerometer.

11 Claims, 3 Drawing Figures

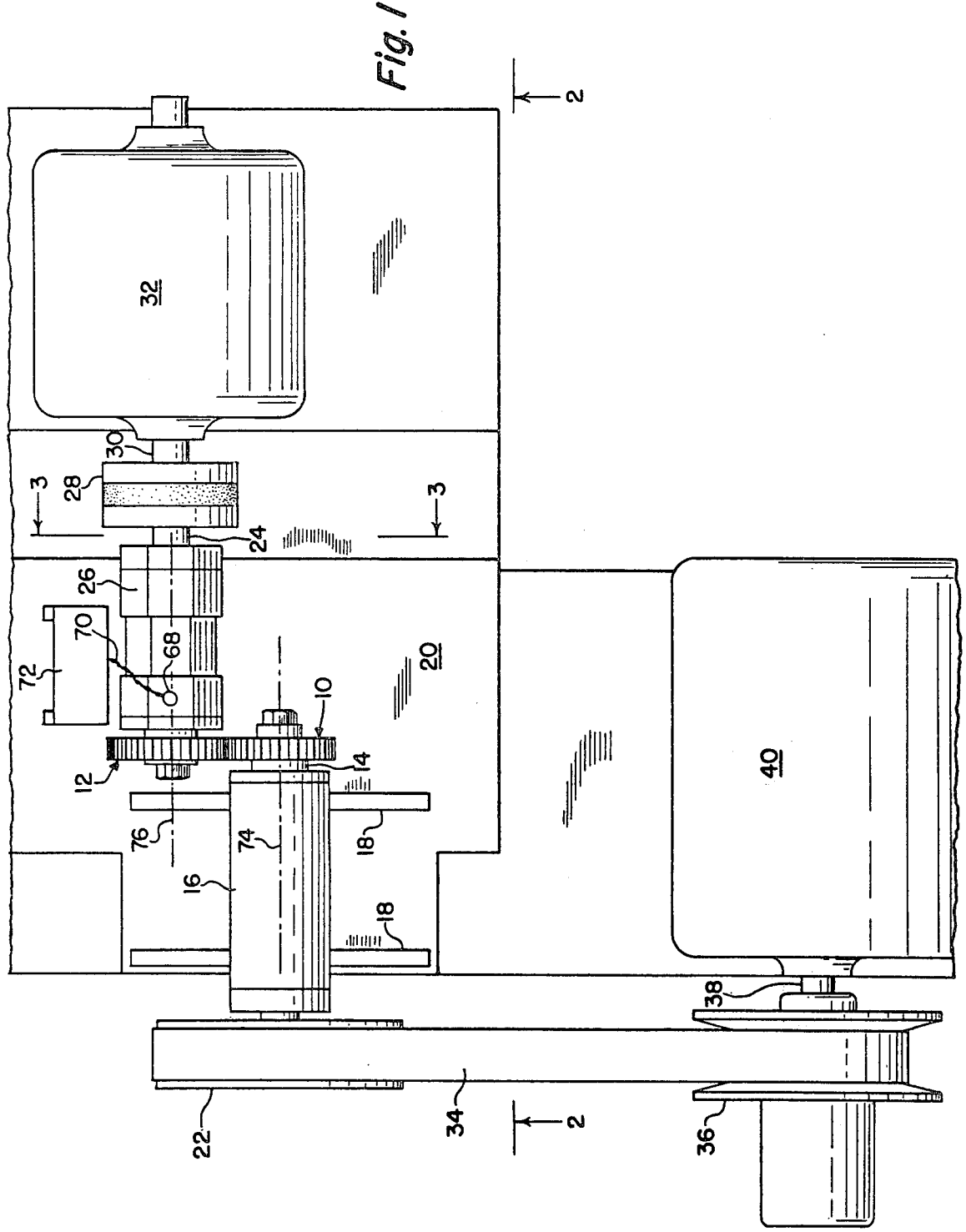

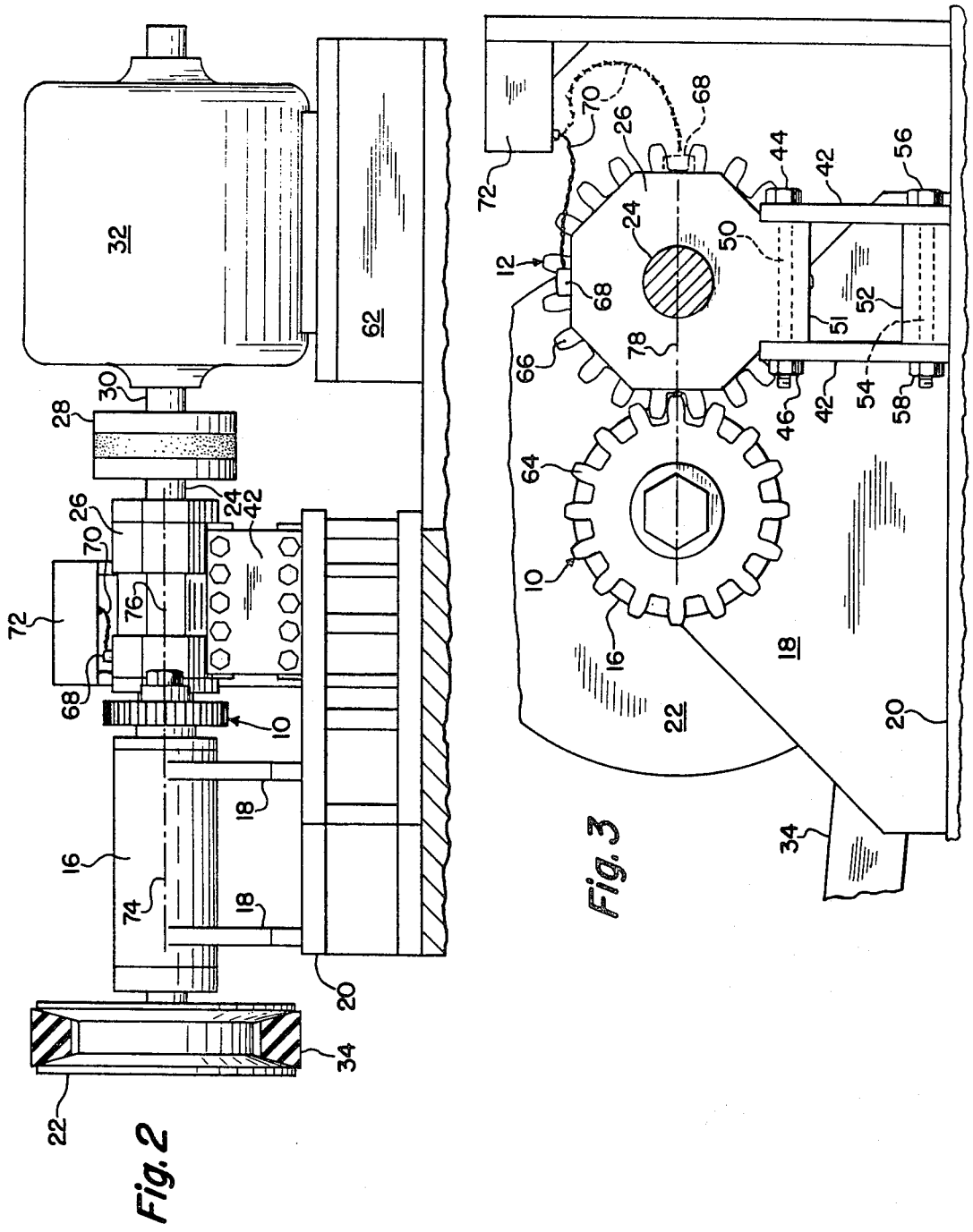

4,252,023

VIBRATION TESTING SYSTEM FOR GEAR SETS

BACKGROUND OF THE INVENTION

Noise testing of gear sets of gears by driving the gears and sensing the resulting vibrations that occur with an accelerometer is a known testing technique. However, during such testing for vibrations it is commonly found that the signal-to-noise ratio of the signal that is sensed by the accelerometer is too low to produce adequate output signals. The present invention substantially improves the signal-to-noise ratio of the output signal by mounting the spindle housing for one of the spindles and resiliently mounting the other spindle housing on a resilient spring system, which is preferably formed by a pair of rectangular-shaped leaf springs. The gears are driven so that the tooth-to-tooth freguency is substantially equal to the resonant frequency of the resiliently mounted spindle housing which achieves a substantial increase in the signal-to-noise ratio of the output signal from the accelerometer.

DESCRIPTION OF THE DRAWINGS

The present invention is described by reference to the drawings in which:

FIG. 1 is a top view of the vibration testing system of the present invention;

FIG. 2 is a side view of the vibration testing system of FIG. 1; and

FIG. 3 is an end view of the vibration testing system of FIG. 1.

TECHNICAL DESCRIPTION OF THE INVENTION

The gear testing system of the present invention is shown in the drawings in which the gears 10 and 12 comprise a gear set that is to be tested. One of the gears alternately may comprise a master gear and the other gear may be a singular gear that is under test. The gear 10 is mounted on a spindle 14 that is contained in a conventional spindle housing 16. The spindle housing 16 is rigidly supported by means of the braces 18 to a massive base 20. The end of the spindle 14 remote from the gear 10 carries a drive pulley 22. The gear 12 is mounted on a spindle 24 which is contained in a conventional spindle housing 26. The end of the spindle 24 which is remote from the gear 12 is connected through a coupler 28 to the shaft 30 of a brake 32. The pulley 22 has a drive belt 34 wrapped around it which is also coupled to a second pulley 36, which is a variable-speed pulley. The pulley 36 in turn is supported by the shaft 38 of a drive motor 40. The drive system, including the pulleys, the shafts, the coupling and the eddy current brake, are proportioned to form a stiff mass spring system.

While the spindle housing 16 is rigidly mounted on the base 20 the spindle housing 26 is resiliently mounted on the base through a pair of rectangular-shaped flat leaf springs 42. The leaf springs 42 are coupled to the bottom of the spindled housing 26 by the bolts 44 and nuts 46, wherein the bolts 44 extend through elongated channels 50 in the lower portion of the spindle housing 26. The base 20 has an upstanding flange 52 which also has a number of elongated channels 54 which receive the bolts 56, so that the bolts 56 and the nuts 58 may secure the lower portion of the springs 42 to the base. A sensing accelerometer 68 for the testing system may be mounted at any convenient location on the resiliently mounted spindle housing 26, and the output from the accelerometer 68 may be coupled through wires 70 to a conventional accelerometer output indicating device, such as a meter or an oscilloscope, 72.

The brake 32 for the gear set may also be supported on the base 62 so that the spindle 24 is in proper vertical alignment with the spindle 14 and the spindles 14 and 24 are aligned to be parallel. The drive motor 40 is preferably driven at a speed such that the tooth-to-tooth frequency of the teeth 64 of the gear 10 and the teeth 66 of the gear 12 produce a tooth-to-tooth frequency which is substantially the same as a resonant frequency of the resiliently supported spindle housing 26. For example, one suitable arrangement for the present invention occurs when the gears are driven at a resonant frequency of approximately 700 cycles per second. At this frequency, reasonable size components may be employed and the signal-to-noise ratio of the resulting output signal will be increased by a factor of about six. It should be noted, however, that even if the tester is driven at a frequency such that the tooth-to-tooth frequency of the gear set is not exactly in resonance with the spindle housing that an improved signal-to-noise ratio may still be obtained. The stiff mass spring system provided by the drive system that includes the eddy current brake 32, which was previously mentioned, provides a strong radial force component for gear tooth deviations that is in line with the accelerometer 68, which further improves the signal-to-noise ratio.

In the described embodiment of the vibration testing system of the present invention, the eddy current brake was coupled to the resiliently mounted spindle and the drive motor was coupled through a belt to a variable speed pulley connected to the rigidly mounted spindle. In construction of the testing system, however, an operational system within the scope of the present invention may be obtained by reversing the drive motor and the brake so that the drive motor is coupled to the resiliently mounted spindle while the brake will be coupled to the rigidly mounted one.

Another modification of the testing system that falls within the scope of the present invention is illustrated in FIG. 3 which shows that the accelerometer 68 may be mounted in the plane 78 which also includes the longitudinal axis 74 of the spindle housing 16 and the longitudinal axis 76 of the spindle housing 26. By mounting the accelerometer 68 in the plane, an increased signal output may be obtained when there is an appreciable center-to-center displacement of the gears under test.

What is claimed is:

1. A testing system for testing gear vibration noises from a first and a second gear of a meshing gear set comprising a first rigidly suppported rotatable spindle means having a longitudinal axis and coupled to said first gear, a second rotatable spindle means having a longitudinal axis that is aligned substantially parallel to the longitudinal axis of the first spindle means and coupled to said second gear, drive means coupled to one of said spindle means for driving said coupled spindle means, resilient mounting means coupled to said second spindle means for resiliently supporting said second spindle means so that said second spindle means and said resilient means comprise a resonant system which has a resonant frequency which is approximately equal to the tooth-to-tooth frequency of said first and second gears at a predetermined drive frequency of said drive means, accelerometer sensing means coupled to said second spindle means for sensing the vibration noises caused by said first and second gears and output means coupled to receive the signal produced by said accelerometer sensing means.

2. A testing system, as claimed in claim 1, further comprising a base wherein said resilient means comprises a pair of parallel oriented generally rectangular-shaped flat leaf springs which are coupled to said base and said second spindle means so as to support said second spindle means above said base with said leaf springs projecting substantially normally to said base.

3. A testing system, as claimed in claim 1, further comprising a brake means wherein the spindle means that is not coupled to said drive means is coupled to said brake means.

4. A testing system, as claimed in claim 3, wherein said brake means comprises an eddy current brake means.

5. A testing system, as claimed in claim 3, wherein said drive means is coupled to said first spindle means and said brake means is coupled to said second spindle means.

6. A testing system, as claimed in claim 5, wherein said brake means comprises an eddy current brake means.

7. A testing system, as claimed in claim 1, wherein said accelerometer sensing means is positioned in a plane with the longitudinal axes of said first and second spindle means so that said axis of said second spindle means lies intermediate said axis of said first spindle means and said accelerometer sensing means.

8. A testing system, as claimed in claim 7, further comprising a brake means wherein the spindle means that is not coupled to said drive means is coupled to said brake means.

9. A testing system, as claimed in claim 8, wherein said brake means comprises an eddy current brake means.

10. A testing system, as claimed in claim 9, wherein said drive means is coupled to said first spindle means and said brake means is coupled to said second spindle means.

11. A testing system, as claimed in claim 10, further comprising a base wherein said resilient means comprises a pair of parallel oriented generally rectangular-shaped flat leaf springs which are coupled to said base and said second spindle means so as to support said second spindle means above said base with said leaf springs projecting substantially normally to said base.

* * * * *